US010735417B2

(12) United States Patent
Tachikawa

(10) Patent No.: US 10,735,417 B2
(45) Date of Patent: Aug. 4, 2020

(54) NETWORK APPARATUS

(71) Applicant: KYOCERA CORPORATION, Kyoto (JP)

(72) Inventor: Hitoya Tachikawa, Yokohama (JP)

(73) Assignee: KYOCERA Corporation, Kyoto (JP)

(*) Notice: Subject to any disclaimer, the term of this patent is extended or adjusted under 35 U.S.C. 154(b) by 177 days.

(21) Appl. No.: 15/553,235

(22) PCT Filed: Feb. 22, 2016

(86) PCT No.: PCT/JP2016/054989
§ 371 (c)(1),
(2) Date: Aug. 24, 2017

(87) PCT Pub. No.: WO2016/136648
PCT Pub. Date: Sep. 1, 2016

(65) Prior Publication Data
US 2018/0034814 A1 Feb. 1, 2018

(30) Foreign Application Priority Data

Feb. 25, 2015 (JP) .................................. 2015-035691

(51) Int. Cl.
H04L 29/06 (2006.01)
H04W 8/22 (2009.01)
(Continued)

(52) U.S. Cl.
CPC ......... *H04L 63/0876* (2013.01); *H04M 11/00* (2013.01); *H04W 8/22* (2013.01);
(Continued)

(58) Field of Classification Search
CPC .. H04L 63/0876; H04W 12/06; H04W 12/08; H04W 8/22; H04W 92/24;
(Continued)

(56) References Cited

U.S. PATENT DOCUMENTS 6,400,939 B1 6/2002 Virtanen et al.
8,483,198 B2 7/2013 Sasao et al.
(Continued)

FOREIGN PATENT DOCUMENTS

JP 2002-505056 A 2/2002
JP 2010-219799 A 9/2010
(Continued)

OTHER PUBLICATIONS

Technical Specification "3GPP TS 23.002 version 12.6.0" Network architecture, Jan. 2015, 110 pages. (Year: 2015).*
(Continued)

*Primary Examiner* — Chau Le
*Assistant Examiner* — Han Yang
(74) *Attorney, Agent, or Firm* — Studebaker & Brackett PC

(57) ABSTRACT

A network apparatus according to an embodiment comprises: a storage unit configured to store apparatus information in which information on a model identifier of a terminal apparatus and use authentication information indicating that the terminal apparatus is granted a use authentication by a predetermined network operator are associated; a receiver configured to receive, from another network apparatus, information on a model identifier of a user terminal accessing a network managed by the predetermined network operator; and a controller configured to notify, based on the information on the model identifier of the user terminal and the apparatus information, the other network apparatus of information for determining whether or not to provide a communication service to the user terminal.

8 Claims, 7 Drawing Sheets

(51) Int. Cl.
*H04W 92/24* (2009.01)
*H04W 12/08* (2009.01)
*H04M 11/00* (2006.01)
*H04W 12/00* (2009.01)
*H04W 12/06* (2009.01)

(52) U.S. Cl.
CPC ..... *H04W 12/00512* (2019.01); *H04W 12/06* (2013.01); *H04W 12/08* (2013.01); *H04W 92/24* (2013.01)

(58) Field of Classification Search
CPC ....... H04W 12/00512; H04W 12/0804; H04W 12/0602; H04M 11/00
See application file for complete search history.

(56) References Cited

U.S. PATENT DOCUMENTS

| | | | |
|---|---|---|---|
| 9,420,590 B2 | 8/2016 | Yano et al. | |
| 2004/0005875 A1* | 1/2004 | Ko | H04W 12/12 455/410 |
| 2009/0253459 A1* | 10/2009 | Naganuma | H04B 1/0475 455/556.1 |
| 2011/0159878 A1* | 6/2011 | Bender | H04M 7/0057 455/445 |
| 2012/0039312 A1* | 2/2012 | Narkar | H04W 8/00 370/338 |
| 2013/0254395 A1* | 9/2013 | Chen | H04W 12/08 709/225 |
| 2014/0099928 A1* | 4/2014 | Caldwell | H04W 48/02 455/411 |
| 2014/0273968 A1* | 9/2014 | Agarwal | H04W 12/06 455/411 |
| 2018/0242221 A1* | 8/2018 | Nagasaka | H04W 60/00 |

FOREIGN PATENT DOCUMENTS

| | | |
|---|---|---|
| JP | 2010-288131 A | 12/2010 |
| JP | 2015-033073 A | 2/2015 |

OTHER PUBLICATIONS

International Search Report issued in PCT/JP2016/054989; dated May 10, 2016.
3rd Generation Partnership Project; Technical Specification Group Core Network and Terminals; Evolved Packet System (EPS); Mobility Management Entity (MME) and Serving GPRS Support Node (SGSN) related interfaces based on Diameter protocol; 3GPP TS 29.272 V13.0.0; Dec. 2014; pp. 1-136; Release 13; 3GPP Organizational Partners.
3rd Generation Partnership Project; Technical Specification Group Services and System Aspects; General Packet Radio Service (GPRS) enhancements for Evolved Universal Terrestrial Radio Access Network (E-UTRAN) access; 3GPP TS 23.401 V13.1.0; Dec. 2014; pp. 1-310; Release 13; 3GPP Organizational Partners.
Huawei, HiSilicon; Regular deterministic IMEI fetch; 3GPP TSG-SA WG2 Meeting #94; S2-124692; Nov. 12-16, 2012; pp. 1-27; New Orleans, USA.

* cited by examiner

NETWORK APPARATUS

TECHNICAL FIELD

The present application relates to a network apparatus in a mobile communication system.

BACKGROUND ART

In LTE (Long Term Evolution) whose specifications are formulated in 3GPP (3rd Generation Partnership Project) that is a project aiming to standardize a cellular communication technology, when an attach procedure of a user terminal is performed, an MME (Mobility Management Entity) transmits, to an EIR (Equipment Identity Register) configured to manage an apparatus identifier for identifying a legitimate terminal apparatus, a check request for checking a status of a predetermined apparatus identifier (see Non Patent Documents 1 and 2). The MME can notify the user terminal of an attach rejection, upon determination based on a checking result from the EIR that the user terminal is an illegitimate terminal apparatus (a stolen terminal apparatus, for example).

Further, in order not to provide a communication service to a terminal apparatus which is against the terms of use of a network operator (hereinafter, NW operator), a vendor (terminal manufacturer) dealing with terminal apparatuses executes a use authentication test (carrier certification test) on a terminal apparatus before being sold in a market. A terminal apparatus that passed the use authentication test obtains a use authentication and is ensured to meet the specification. The NW operator manages information on the terminal apparatus with the use authentication.

PRIOR ART DOCUMENT

Non-Patent Document

Non Patent Document 1: 3GPP Technical Specification "TS 23.401 V13.1.0" Dec. 17, 2014
Non Patent Document 2: 3GPP Technical Specification "TS 29.272 V13.0.0" Jan. 6, 2015

SUMMARY OF THE INVENTION

A network apparatus according to a first aspect is a network apparatus in a mobile communication system. The network apparatus comprises: a storage unit configured to store apparatus information in which information on a model identifier of a terminal apparatus and use authentication information indicating that the terminal apparatus is granted a use authentication by a predetermined network operator are associated; a receiver configured to receive, from another network apparatus, information on a model identifier of a user terminal accessing a network managed by the predetermined network operator; and a controller configured to notify, based on the information on the model identifier of the user terminal and the apparatus information, the other network apparatus of information for determining whether or not to provide a communication service to the user terminal.

A network apparatus according to a second aspect is a network apparatus. The network apparatus comprises: a receiver configured to receive, from another network apparatus, information on a model identifier of a user terminal accessing a network managed by a predetermined network operator; and a controller configured to obtain, from a storage device configured to store apparatus information in which information on a model identifier of a terminal apparatus and use authentication information indicating that the terminal apparatus is granted a use authentication by the predetermined network operator are associated, the use authentication information corresponding to a model identifier of the user terminal. The controller notifies, based on the use authentication information obtained from the storage device and a model identifier of the user terminal, the other network apparatus of information for determining whether or not to provide a communication service to the user terminal.

DESCRIPTION OF THE EMBODIMENT

8 Overview of Embodiment

Figure 1:
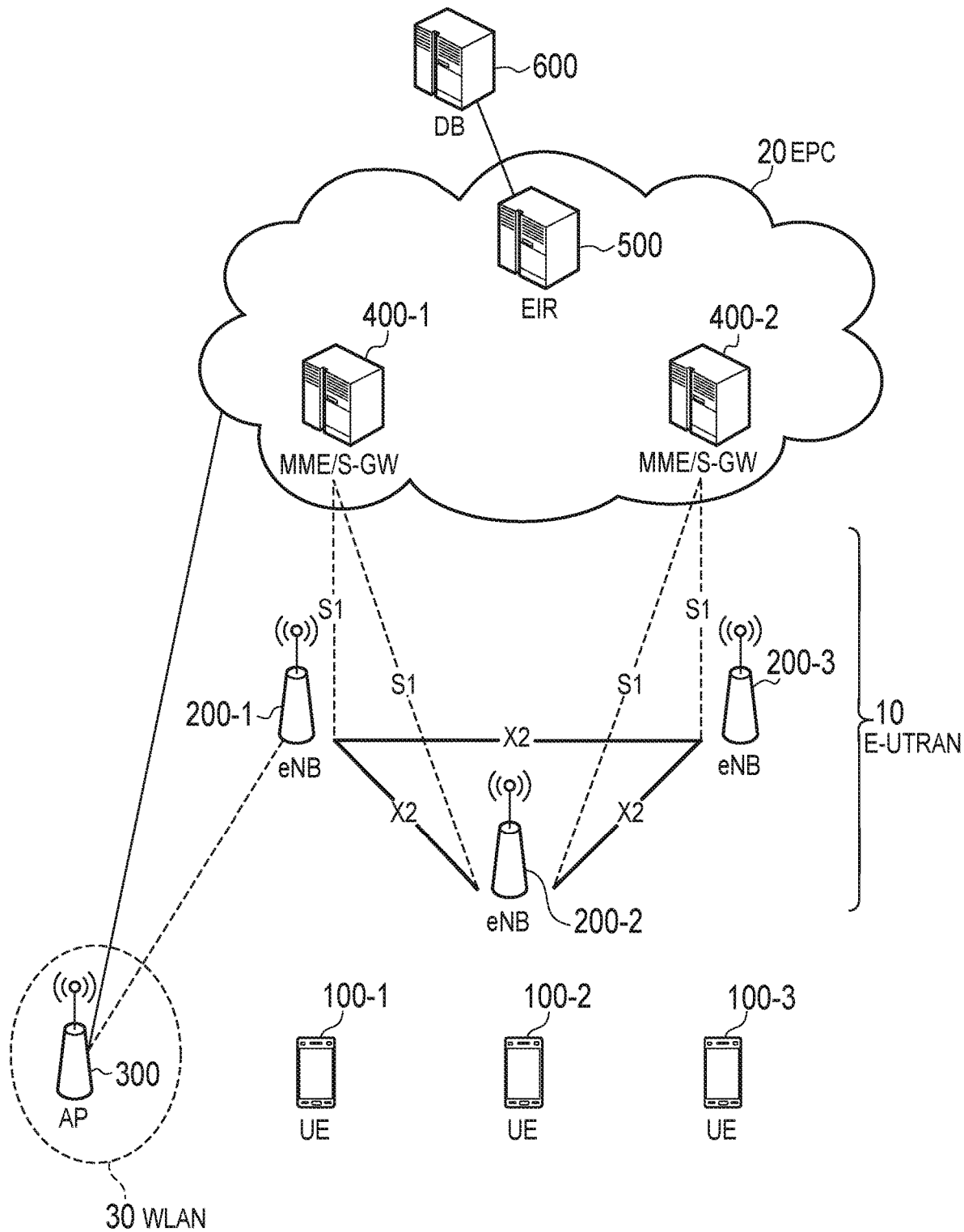
FIG. 1 is a diagram illustrating a system configuration.

In recent years, terminal apparatuses (that is, SIM free terminals) from which UIM (User Identity Module) restriction has been released are increasing. By changing a UIM mounted into a SIM free terminal, it is possible to receive communication service provisions from different NW operators by using the SIM free terminal.

Here, if a SIM free terminal mounted with a UIM storing therein contract information of a predetermined NW operator, is not an illegitimate terminal apparatus, even though the SIM free terminal is not granted the use authentication by the predetermined NW operator, the predetermined NW operator may provide a communication service to the SIM free terminal.

Therefore, in view of the possibility that the above-described situation occurs, provided is a network apparatus capable of restricting a communication service to a terminal apparatus without a use authentication by an NW operator.

A network apparatus (e.g. an EIR 500 or a DB 600) according to first and second embodiments is a network apparatus in a mobile communication system. The network apparatus comprises: a storage unit configured to store apparatus information in which information on a model identifier of a terminal apparatus and use authentication information indicating that the terminal apparatus is granted a use authentication by a predetermined network operator are associated; a receiver configured to receive, from another network apparatus, information on a model identifier of a user terminal accessing a network managed by the predetermined network operator; and a controller configured to notify, based on the information on the model identifier of the user terminal and the apparatus information, the other network apparatus of information for determining whether or not to provide a communication service to the user terminal.

In first and second embodiments, the information on the model identifier is an identifier partly configured by the model identifier and is an apparatus identifier for identifying the terminal apparatus.

In first and second embodiments, the storage unit stores the apparatus identifier and authentication related information on a country where a terminal apparatus is legally authenticated for transmission using a predetermined access technology, in an associated manner. The controller includes the authentication related information corresponding to the apparatus identifier received from the other network apparatus, into the information for determining.

In first and second embodiments, the controller notifies the other network apparatus of the use authentication information corresponding to information on the model identifier received from the other network apparatus, as the information for determining.

In first and second embodiments, the receiver receives the apparatus identifier by receiving a check request for checking a status of the apparatus identifier. The controller checks the apparatus identifier, based on the apparatus information, and notifies the other network apparatus of a check result as the information for determining.

In first and second embodiments, the storage unit further stores the apparatus identifier and illegitimate information indicating that the terminal apparatus is an illegitimate terminal apparatus, in an associated manner. The controller notifies the other network apparatus of the check result for not providing the communication service to the user terminal, if the terminal apparatus is the illegitimate terminal apparatus, even when the terminal apparatus corresponding to the apparatus identifier is a terminal apparatus with a use authentication by the predetermined network operator.

A network apparatus (e.g. an EIR 500) according to first and second embodiments is a network apparatus. The network apparatus comprises: a receiver configured to receive, from another network apparatus, information on a model identifier of a user terminal accessing a network managed by a predetermined network operator; and a controller configured to obtain, from a storage device configured to store apparatus information in which information on a model identifier of a terminal apparatus and use authentication information indicating that the terminal apparatus is granted a use authentication by the predetermined network operator are associated, the use authentication information corresponding to a model identifier of the user terminal. The controller notifies, based on the use authentication information obtained from the storage device and a model identifier of the user terminal, the other network apparatus of information for determining whether or not to provide a communication service to the user terminal.

In a first embodiment, the information on the model identifier is an identifier partly configured by the model identifier and is an apparatus identifier for identifying the terminal apparatus.

In a first embodiment, the storage device stores the apparatus identifier and authentication related information on a country where a terminal apparatus is legally authenticated for transmission using a predetermined access technology, in an associated manner. The controller obtains, together with the use authentication information, the authentication related information corresponding to the apparatus identifier received from the other network apparatus. The controller includes the authentication related information, into the information for determining.

In a first embodiment, the controller notifies the other network apparatus of the use authentication information received from the storage device, as the information for determining.

In a first embodiment, the receiver receives the apparatus identifier by receiving a check request for checking a status of the apparatus identifier. The controller checks the apparatus identifier, based on the use authentication information received from the storage device, and notifies the other network apparatus of a check result as the information for determining.

In a first embodiment, the storage device further stores the apparatus identifier and illegitimate information indicating that the terminal apparatus is an illegitimate terminal apparatus, in an associated manner. The controller notifies the other network apparatus of the check result for not providing the communication service to the user terminal, if the terminal apparatus is the illegitimate terminal apparatus, even when the terminal apparatus corresponding to the apparatus identifier is a terminal apparatus with a use authentication by the predetermined network operator.

EMBODIMENT

Below, with reference to the figure, a case where an LTE system being a cellular communication system configured in compliance with the 3GPP standards can be linked with a wireless LAN (WLAN) system will be described as an example.

System Configuration

FIG. 1 is a system configuration diagram according to an embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20.

The E-UTRAN 10 corresponds to cellular RAN. The EPC 20 corresponds to a core network. The E-UTRAN 10 and the EPC 20 constitute a network of an LTE system.

The UE 100 is a mobile radio communication apparatus. The UE 100 corresponds to a user terminal. The UE 100 is a terminal (dual terminal) that supports both a cellular communication scheme and a WLAN communication scheme. It is noted that the UE 100 may be a terminal supporting a cellular communication only.

The E-UTRAN 10 includes a plurality of eNBs 200 (evolved Node-Bs). The eNB 200 corresponds to a base station. The eNB 200 manages one or a plurality of cells and performs radio communication with the UE 100 which exists on the cell of the eNB 200. The "cell" is used as a term indicating a minimum unit of a radio communication area, and is also used as a term indicating a function of performing radio communication with the UE 100. The eNB 200 has a radio resource management (RRM) function, a routing function of user data, and a measurement control function for mobility control and scheduling.

The eNBs 200 are connected mutually via an X2 interface. The eNB 200 is connected to MME (Mobility Management Entity)/S-GW (Serving-Gateway) 400 included in the EPC 20 via an S1 interface.

The EPC 20 includes a plurality of MMEs/S-GWs 400, and at least one or more EIR 500. The MME is a network node for performing various mobility controls, for example, for the UE 100, and corresponds to a control station. The S-GW is a network node that performs transfer control of user data and corresponds to a mobile exchange center.

The EIR (Equipment Identity Register) 500 is a network node configured to manage a apparatus identifier (for example, International Mobile station Equipment Identity: IMEI) for identifying the UE 100 (terminal apparatus). The EIR 500 can access to the DB 600 which is a network node configured to store apparatus information. The DB 600 is a storage device present in an external network. It is noted that the DB 600 may be included in the EPC 20.

A WLAN 30 includes a WLAN access point (hereinafter, referred to as "AP") 300. The AP 300 is an AP (Operator controlled AP) managed by a NW operator of the LTE system, for example.

The WLAN 30 is configured to comply with standards of IEEE 802.11, for example. The AP 300 performs WLAN communication with the UE 100 in a frequency band different from a cellular frequency band. Generally, the WLAN communication is performed through an unlicensed band. The cellular communication is performed through a licensed band. The AP 300 is connected to the EPC 20 via a router, etc.

In addition to a case where the eNB 200 and the AP 300 are separate nodes, the eNB 200 and the AP 300 may be "Collocated" by regarding the eNB 200 and the AP 300 as the identical node. A configuration of an eNB 200 that is a cellular/WLAN collocated eNB 200 configured to support the cellular communication and the WLAN communication (hereinafter, referred to as a "cellular/WLAN collocated eNB 200") will be described later. Alternatively, the eNB 200 and the AP 300 may be mutually connected via a direct interface.

The EPC 20 may further include an access network discovery and selection function (ANDSF) server. The ANDSF server manages ANDSF information related to the WLAN 30. The ANDSF server provides the UE 100 with the ANDSF information related to the WLAN 30.

Subsequently, a configuration of the UE 100, the eNB 200, the AP 300, the EIR 500, and the DB 600 will be described.

Figure 2:
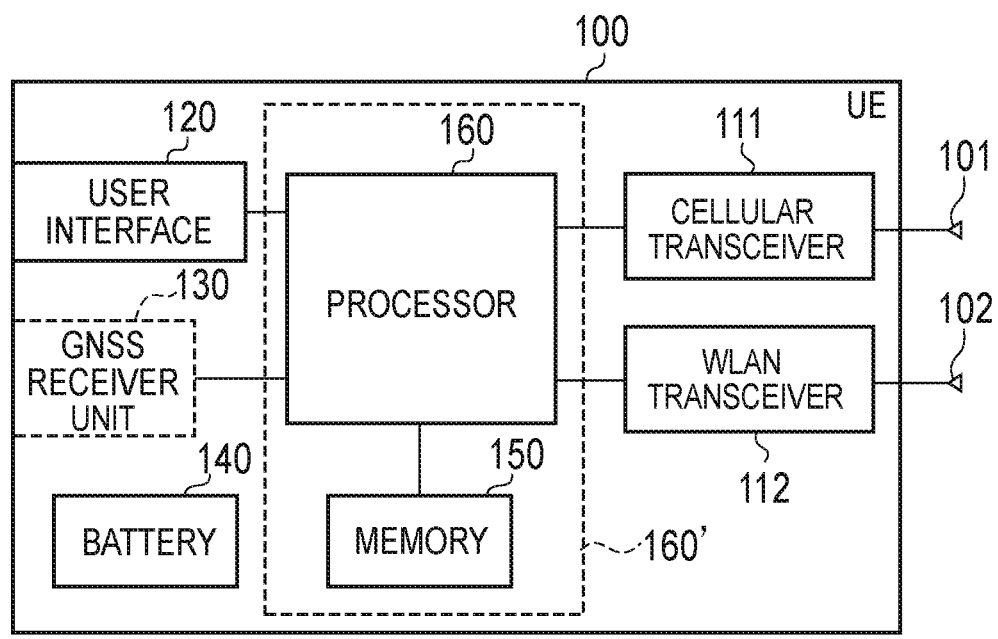
FIG. 2 is a block diagram of a UE.

FIG. 2 is a block diagram of the UE 100. As illustrated in FIG. 2, the UE 100 includes: antennas 101 and 102; a cellular transceiver 111; a WLAN transceiver 112; a user interface 120; a GNSS (Global Navigation Satellite System) receiver 130; a battery 140; a memory 150; and a processor 160. The memory 150 and the processor 160 constitute a controller. The UE 100 may not have the GNSS receiver 130 and the user interface 120. The UE 100 may not have the antennas 102 and the WLAN transceiver 112. Furthermore, the memory 150 may be integrally formed with the processor 160, and this set (that is, a chipset) may be called a processor 160'.

The antenna 101 and the cellular transceiver 111 are used for transmitting and receiving cellular radio signals. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used to transmit and receive a WLAN radio signal. The WLAN transceiver 112 converts a baseband signal output from the processor 160 into a WLAN radio signal, and transmits the same from the antenna 102. Further, the WLAN transceiver 112 converts a WLAN radio signal received by the antenna 102 into a baseband signal, and outputs the same to the processor 160.

The user interface 120 is an interface for use by a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for processes by the processor 160. In the present embodiment, the memory 150 stores information on a model identifier of the UE 100 described later. It is noted that the memory 150 configured to store the information is not a memory in a user identity module (UIM) which is an IC card mounted into the terminal apparatus, but a memory in the terminal apparatus. The information may also be stored in the memory in the UIM.

The processor 160 includes a baseband processor that performs modulation and demodulation, encoding and decoding and the like on the baseband signal and a CPU that performs various processes by executing the program stored in the memory 150. The processor 160 may further include a codec that performs encoding and decoding on audio and video signals. The processor 160 executes various processes and various communication protocols described later.

Figure 3:
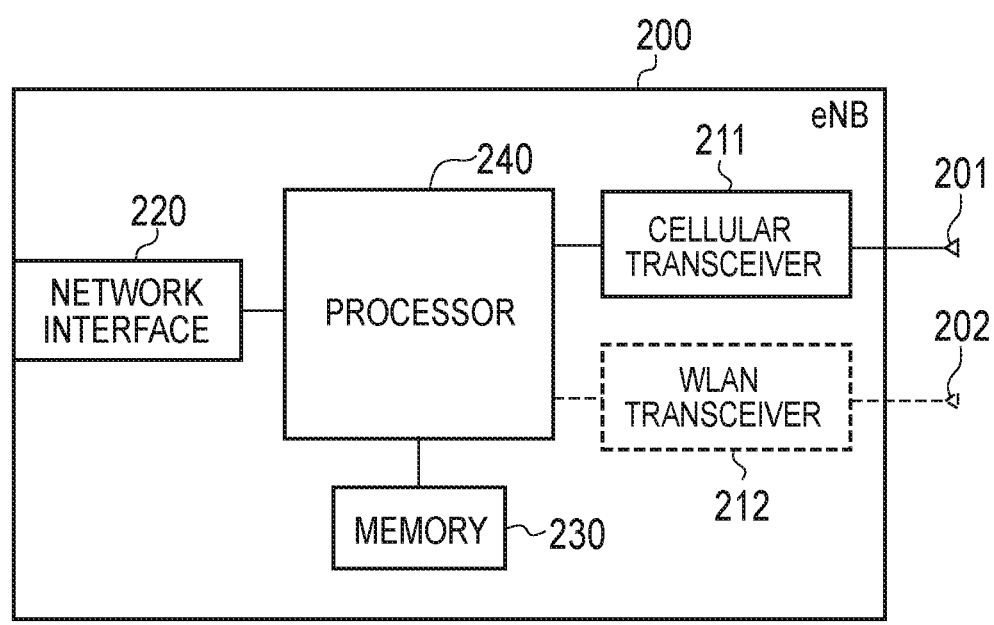
FIG. 3 is a block diagram of an eNB.

FIG. 3 is a block diagram of the eNB 200. As illustrated in FIG. 3, the eNB 200 includes an antenna 201, a cellular transceiver 211, a network interface 220, a memory 230, and a processor 240. The memory 230 and the processor 240 constitute a controller. Furthermore, the memory 230 may be integrally formed with the processor 240, and this set (that is, a chipset) may be called a processor.

The antenna 201 and the cellular transceiver 211 are used for transmitting and receiving a cellular radio signal. The cellular transceiver 211 converts the baseband signal output from the processor 240 into the cellular radio signal, and transmits the same from the antenna 201. Furthermore, the cellular transceiver 211 converts the cellular radio signal received by the antenna 201 into the baseband signal, and outputs the same to the processor 240.

The network interface 220 is connected to the neighboring eNB 200 via an X2 interface and is connected to the MME/S-GW 400 via the S1 interface. The network interface 220 may be connected with the AP 300 via a direct interface.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various processes by executing the program stored in the memory 230. The processor 240 implements various processes and various communication protocols described later.

In addition, when the eNB 200 is a cellular/WLAN collocated-type, the eNB 200 further includes an antenna 202 and a WLAN transceiver 212. The antenna 202 and the WLAN transceiver 212 are used to transmit and receive a WLAN radio signal. The WLAN transceiver 212 converts a baseband signal output from the processor 240 into a WLAN radio signal and transmits the same from the antenna 202. Further, the WLAN transceiver 212 converts a WLAN radio signal received by the antenna 202 into a baseband signal and outputs the same to the processor 240.

Figure 4:
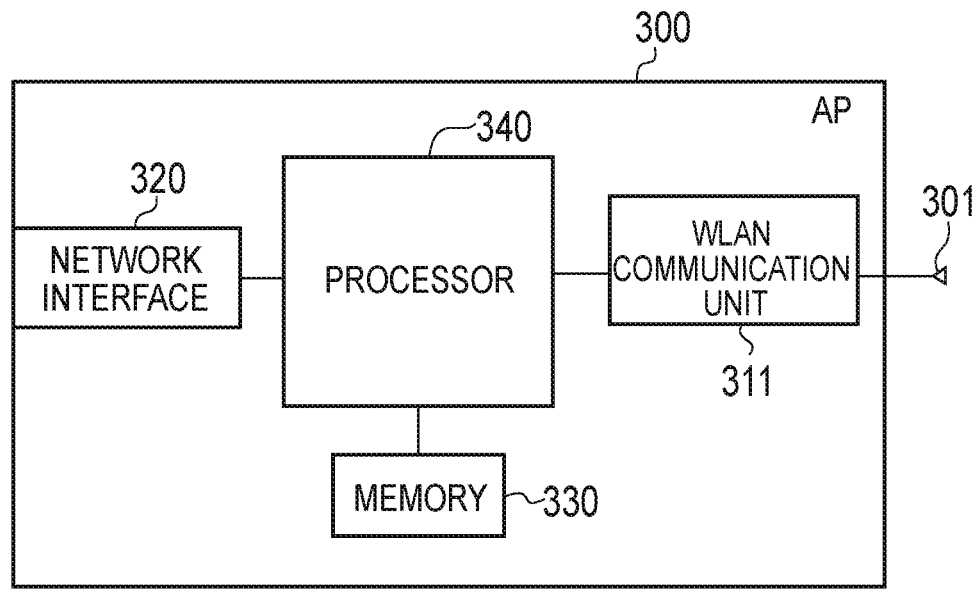
FIG. 4 is a block diagram of an AP.

FIG. 4 is a block diagram of the AP 300. As shown in FIG. 4, the AP 300 includes an antenna 301, a WLAN communication unit (a WLAN transceiver) 311, a network interface 320, a memory 330, and a processor 340. The memory 330 may be integrally formed with the processor 340, and this set (that is, a chipset) may be called a processor.

The antenna 301 and the WLAN communication unit 311 are used to transmit and receive a WLAN radio signal. The WLAN communication unit 311 converts a baseband signal output from the processor 340 into a WLAN radio signal and transmits the same from the antenna 301. Further, the WLAN communication unit 311 converts a WLAN radio signal received by the antenna 301 into a baseband signal and outputs the same to the processor 340.

The network interface 320 is connected to the eNB 200 via a direct interface.

The memory 330 stores a program to be executed by the processor 340 and information to be used for a process by the processor 340. The processor 340 includes a baseband processor that performs modulation and demodulation, encoding and decoding and the like of a baseband signal, and a CPU that performs various processes by executing the program stored in the memory 330. The processor 340 executes various processes described later.

Figure 5:
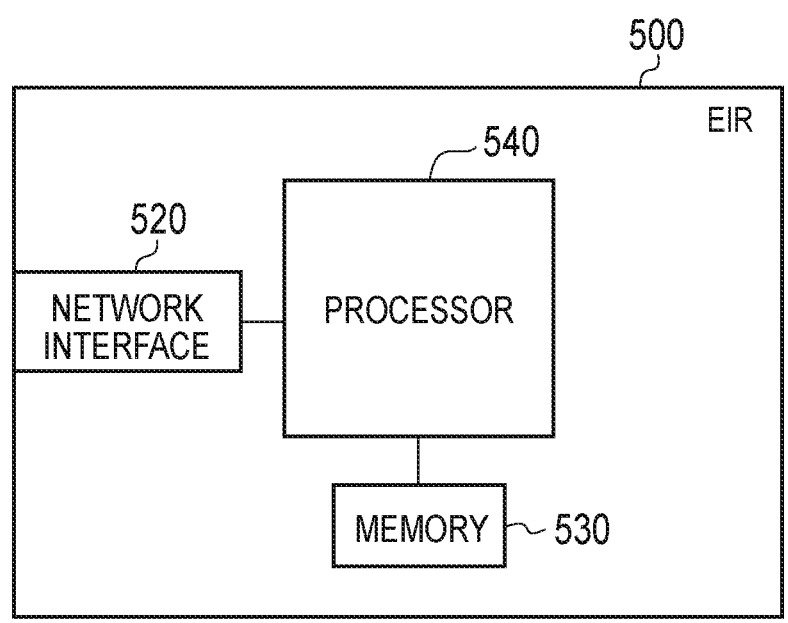
FIG. 5 is a block diagram of an EIR.

FIG. 5 is a block diagram of the EIR 500. As illustrated in FIG. 5, the EIR 500 includes a network interface 520, a memory 530, and a processor 540. The memory 530 may be integrally formed with the processor 540, and this set (that is, a chipset) may be used as a processor.

The network interface 520 is connected, via a predetermined interface, to an MME 400. Further, the network interface 520 is connected, via a predetermined interface, to the DB 600.

The memory 530 stores a program to be executed by the processor 540 and information used for a process by the processor 540. The processor 540 includes a baseband processor that performs modulation and demodulation, encoding and decoding and the like of a baseband signal, and a CPU that performs various processes by executing a program stored in the memory 530. The processor 540 performs various processes described later.

Figure 6:
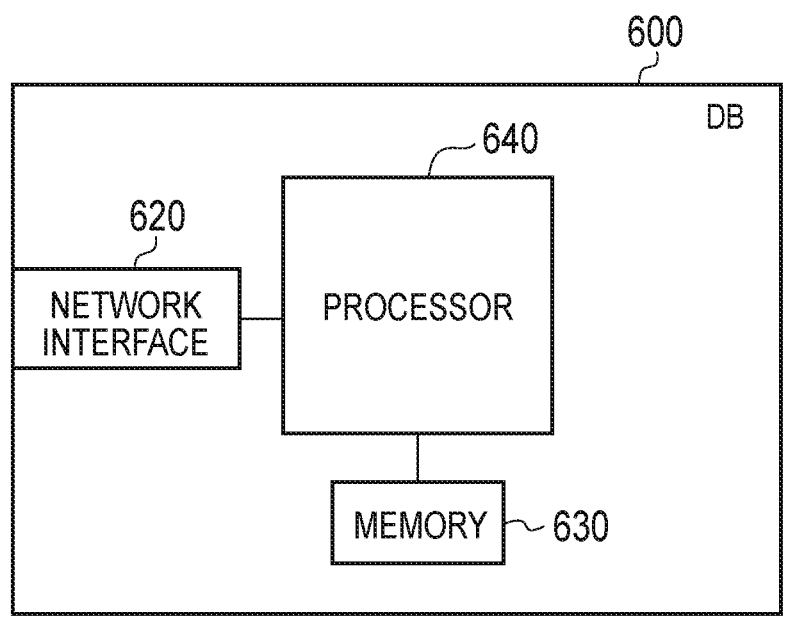
FIG. 6 is a block diagram of a DB.

FIG. 6 is a block diagram of the DB 600. As illustrated in FIG. 6, the DB 600 includes a network interface 620, a memory 630, and a processor 640. The memory 630 may be integrally formed with the processor 640, and this set (that is, a chipset) may be used as a processor.

The network interface 620 is connected, via a predetermined interface, to the EIR 500.

The memory 630 stores a program executed by the processor 640 and information used for a process by the processor 640. In the present embodiment, the memory 630 stores apparatus information (see FIG. 7). The apparatus information is information in which information on a model identifier (Type Allocation Code: TAC) indicating a model of a terminal apparatus is associated with use authentication information indicating that the terminal apparatus is granted the use authentication by the NW operator (NW Operator license (Equipment use authentication): OK). The apparatus information may include information in which information on the model identifier is associated with usage un-authentication information indicating that the terminal apparatus is not granted use authentication by the NW operator (NW Operator license (Equipment use authentication): NG).

The information related to the model identifier may be the model identifier (TAC) itself. Alternatively, the information may be information partly configured by the model identifier. For example, the information may be an IMEI partly configured by the TAC. It is noted that the IMEI is an identifier configured by an 8-digit TAC, an SNR (serial number) uniquely assigned to the terminal apparatus, and a 1-digit spare. Alternatively, the information may be an IMEISV (IMEI software version), which is an identifier configured by information obtained by eliminating a spare from the IMEI and a software version.

The use authentication information is information indicating that the terminal apparatus is granted the use authentication by the NW operator. For example, the terminal apparatus is granted the use authentication, provided that the apparatus conforms to a frequency (carrier) provided by the NW operator. That is, the use authentication is given to the terminal apparatus, provided that the apparatus can communicate in the frequency. It is noted that, the NW operator may give the use authentication, provided that the terminal apparatus can comply not only with the frequency but also with other items in the terms of use of the NW operator.

Figure 7:
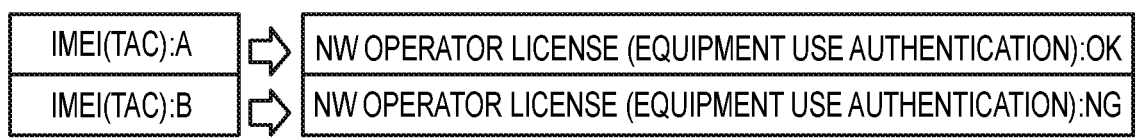
FIG. 7 is a diagram for describing an example of apparatus information.

The apparatus information may include information in which information on the model identifier is associated with information indicating that the terminal apparatus is not granted the use authentication. In the example of FIG. 7, while a terminal apparatus whose IMEI (TAC) is A is granted the use authentication, a terminal apparatus whose IMEI (TAC) is B is not granted the use authentication.

The apparatus information may be updated in accordance with an update of the UE 100 (terminal apparatus). For example, the information on the use authentication (for example, information indicating that it is not granted the use authentication by the NW operator) may be updated by updating a software which is a driver circuit (driver) and/or an operating system (OS) of the UE 100 (terminal apparatus). Alternatively, the apparatus information (authentication related information) may be updated by adding information of a country newly authorizing IEEE specifications, to the authentication related information. It is noted that the apparatus information may be updatable by the NW operator or a vendor dealing with terminal apparatuses.

The processor 640 includes a baseband processor configured to perform modulation and demodulation, encoding and decoding and the like of a baseband signal, and a CPU configured to perform various processes by executing a program stored in the memory 630. The processor 640 executes various processes described later.

It is noted that, in the LTE system, OFDMA (Orthogonal Frequency Division Multiple Access) is applied to the downlink, and SC-FDMA (Single Carrier Frequency Division Multiple Access) is applied to the uplink, respectively.

The radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Of the radio resources (time and frequency resources) allocated to the UE 100, a frequency resource can be identified by a resource block and a time resource can be identified by a subframe (or a slot).

Operation According to Embodiment

Figure 8:
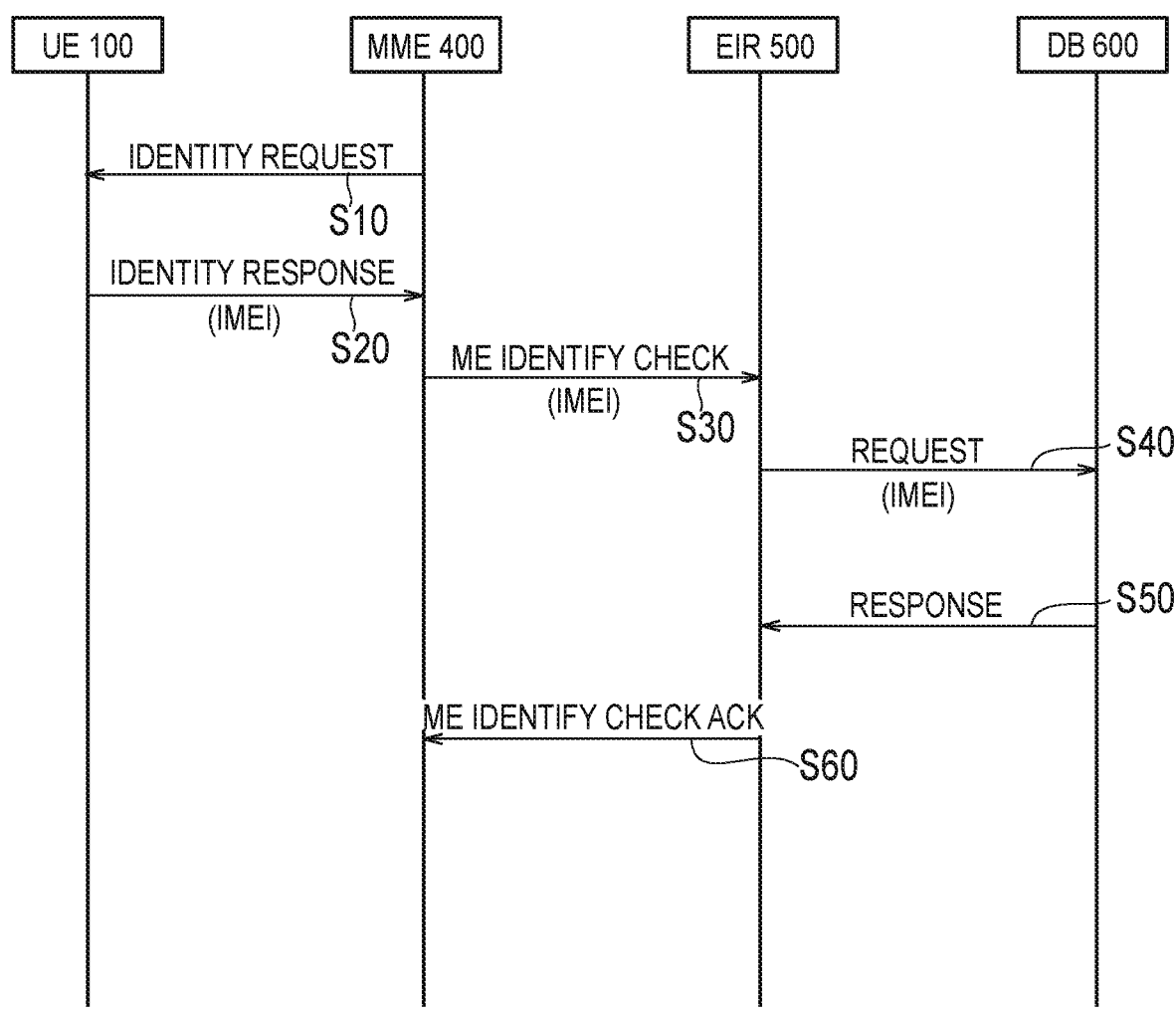
FIG. 8 is a sequence diagram for describing an operation according to a first embodiment.

Next, an operation according to the embodiment will be described by using FIG. 8. FIG. 8 is a sequence diagram for describing an operation according to the first embodiment.

In step S10, the MME 400 notifies the UE 100 of an identity request. The MME 400 may notify the UE 100 of the identity request, in response to the UE 100 starting an attach procedure. The UE 100 receives the identity request. The identity request is for requesting an apparatus identifier of the UE 100.

In step S20, the UE 100 notifies the MME 400 of a response (Identity Response) to the identity request. The UE 100 can notify the MME 400 of the response by a NAS message. In the present embodiment, the UE 100 includes the IMEI in the response. The MME 400 receives the response.

In step S30, the MME 400 notifies the EIR 500 of checking information (ME Identify Check) for checking the apparatus identifier. The checking information includes the apparatus identifier (IMEI).

The EIR 500 receives the apparatus identifier by receiving the checking information. The EIR 500 checks, in response to a reception of the checking information, (a status of) the apparatus identifier included in the checking information. For example, the EIR 500 checks whether or not the terminal apparatus indicated by the apparatus identifier is stolen. Further, the EIR 500 may verify that the terminal apparatus indicated by the apparatus identifier does not have a fault.

In step S40, the EIR 500 requests the DB 600 to provide determination information for determining whether or not the NW operator provides a communication service to the UE 100. The EIR 500 may request the DB 600 to provide the determination information, in response to the reception of the checking information. Alternatively, the EIR 500 may request the DB 600 to provide the determination information, if the terminal apparatus indicated by the apparatus identifier is a legitimate terminal, that is, if the terminal apparatus is not an unlawful terminal apparatus (a stolen terminal, for example). The request includes the apparatus identifier (IMEI) received from the MME. The DB 600 receives the apparatus identifier by receiving the request.

In step S50, the DB 600 which receives the request, notifies the EIR 500 of a response to the request. The DB 600 includes, in response to a reception of the request, the determination information into the response to the request, and notifies the EIR 500 of the determination information, based on the apparatus identifier included in the request and the apparatus information stored in the DB 600.

Specifically, the DB 600 includes the use authentication information associated with the apparatus identifier included in the request, into the determination information. If the terminal apparatus indicated by the apparatus identifier is not granted the use authentication by the NW operator (NG) or if the apparatus identifier is not stored, the DB 600 may include this fact into the determination information.

The EIR 500 obtains, by receiving the response notified from the DB 600, the determination information corresponding to the apparatus identifier.

In step S60, the EIR 500 which receives the determination information, notifies the MME 400 of an acknowledgment (ME Identity Check Ack) to the checking information. The acknowledgment includes a result of checking the (state of) the apparatus identifier.

The EIR 500 can include a checking result into the acknowledgment as information for determining whether or not to provide the communication service to the UE 100. The EIR 500 can include, if the terminal apparatus of the UE 100 is not granted the use authentication, the checking result which results in the UE 100 not providing the communication service, into the acknowledgment. For example, if storing the terminal identifier and the information indicating an illegitimate terminal in an associated manner, the EIR 500 may include the checking result indicating an unauthorized terminal into the response, even if the terminal apparatus of the UE 100 is not the illegitimate terminal. Alternatively, the EIR 500 may include, if the terminal apparatus of the UE 100 is not granted the use authentication, the checking result indicating that the authorization is not given by the RAT, into the acknowledgment, for example.

Alternatively, the EIR 500 may include, separately from the checking result, the determination information (use authentication information) received from the DB 600, into the acknowledgment. Alternatively, the EIR 500 may determine, based on the determination information, whether or not the UE 100 is granted the use authentication, and include, separately from the checking result, the determination result into the acknowledgment. Alternatively, based on the determination information, the EIR 500 may include, separately from the checking result, the information indicating whether or not to provide the communication service to the UE 100 into the acknowledgment.

The MME 400 which receives the acknowledgment determines, based on the acknowledgment, whether or not to provide the communication service to the UE 100. The MME 400 determines, even if the checking result indicates that the terminal apparatus of the UE 100 is not the illegitimate terminal, not to provide the communication service to the UE 100, if the UE 100 is not granted the use authentication. In this case, the MME 400 starts an operation for denying access from the UE 100.

On the other hand, the MME 400 starts, if the UE 100 is granted the use authentication (and if the checking result is good), an operation for providing the communication service to the UE 100. For example, the MME 400 continues the attach procedure for the UE 100.

As described above, the DB 600 can notify, based on the apparatus identifier and the apparatus information, the EIR 500 of the determination information for determining whether or not to provide the communication service to the UE 100. Further, the EIR 500 can notify, based on the apparatus identifier and the determination information (use authentication information) notified from the DB 600, the MME 400 of the determination information for determining whether or not to provide the communication service to the UE 100. Thereby, even though the UE 100 is not granted the use authentication by the NW operator, it is possible to suppress the NW operator from providing the communication service to the UE 100. Therefore, it is possible to restrict the communication service to the terminal apparatus (a SIM free terminal, for example) not granted with the use authentication by the NW operator.

It is noted that, as described in a modification below, even if the terminal apparatus is a legitimate terminal apparatus that is authenticated by a country in terms of transmission using a specific radio access technology (RAT), it is possible to restrict the communication service to the terminal apparatus not granted with the use authentication by the NW operator.

Modification

Figure 9:
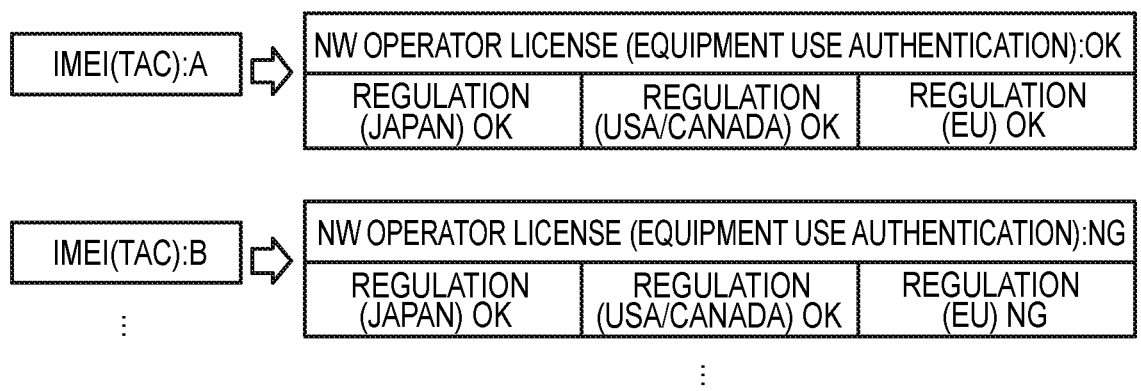
FIG. 9 is a diagram for describing an example of the apparatus information.
Figure 10:
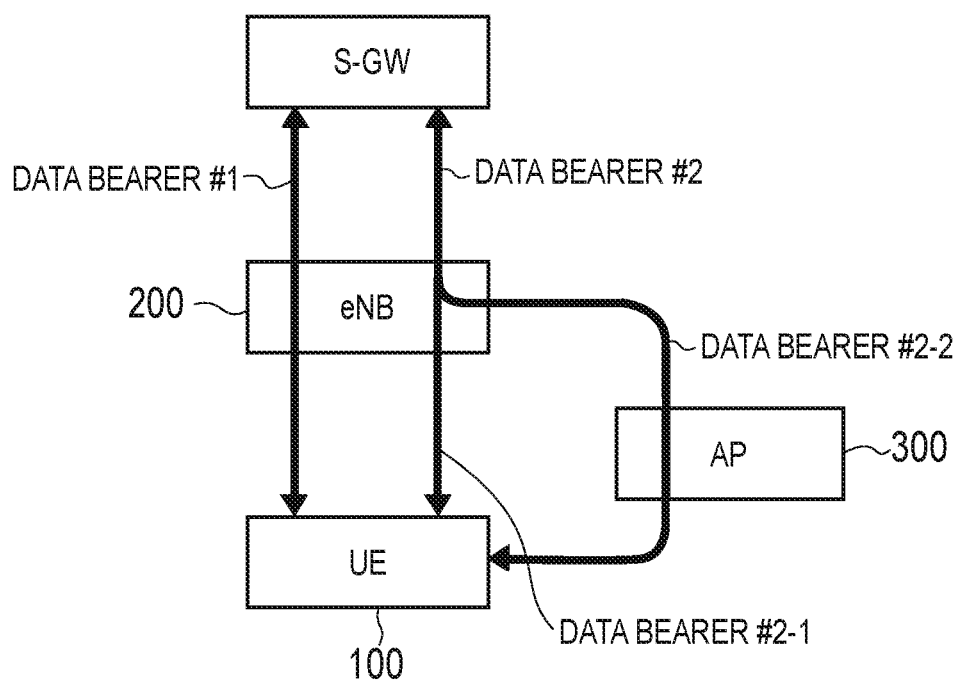
FIG. 10 is a diagram illustrating a basic operation of cellular/WLAN aggregation.
Figure 11:
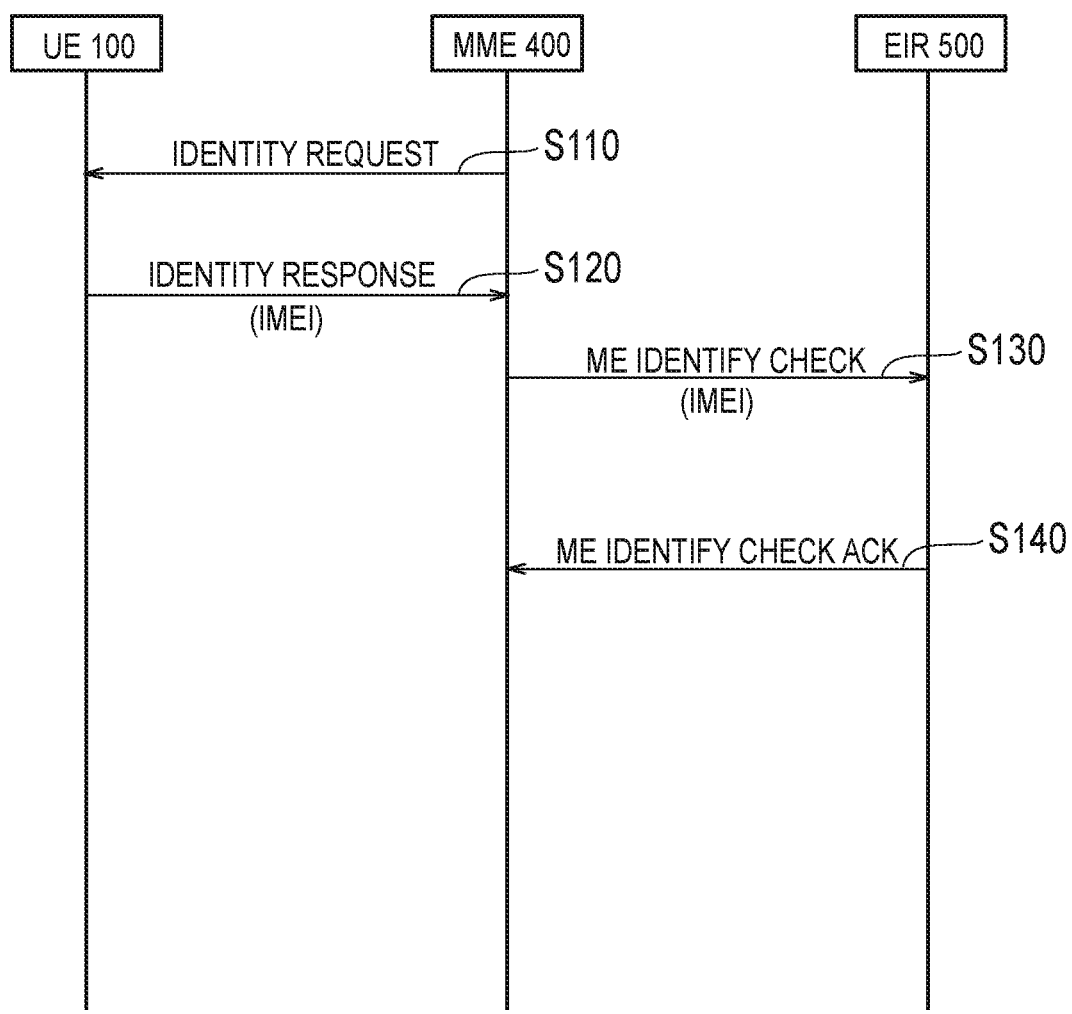
FIG. 11 is a sequence diagram for describing an operation according to a modification of the embodiment.

Next, an operation according to the modification of the embodiment will be described with reference to FIG. 9 to FIG. 11. FIG. 9 is a diagram for describing an example of the apparatus information. FIG. 10 is a diagram illustrating a basic operation of the cellular/WLAN aggregation. FIG. 11 is a sequence diagram for describing an operation according to the modification of the embodiment.

In the above-described embodiment, a case is described where the DB 600 stores the apparatus information. In the present modification, a case is described where the EIR 500 stores the apparatus information. Further, in the present modification, an example is also described where the apparatus information includes the authentication related information.

In the present embodiment, the authentication related information is information on a country where the UE 100 (terminal apparatus) is legally authenticated for transmission by the WLAN transceiver 112. Details are provided below.

In order for the UE 100 to perform transmission (WLAN communication, for example) using a specific radio access technology (RAT), the terminal apparatus needs to meet the requirements prescribed in laws or ordinances (Wireless Telegraphy Act). The laws or ordinances are stipulated in each country, and the user terminal obtains usage permission (authentication) by meeting the requirements of the laws or ordinances in each country. The UE 100 can legally perform transmission by using the specific radio access technology in the authenticated country.

Generally, a vendor dealing with terminal apparatuses has obtained the authentication for a terminal apparatus before being sold in a market, in a country where the NW operator provides the service. Therefore, terminal apparatuses that comply with the laws or ordinances are sold.

However, a terminal apparatus from which the restriction of the UIM (User Identity Module) has been released (that is, a SIM free terminal) may receive a service from an NW operator that is different from an NW operator that was originally assumed to provide a service.

Here, in the LTE, proposed is the cellular/WLAN aggregation which is a technology for transmitting and receiving data of the UE 100 by using both the cellular communication (LTE communication) and the WLAN communication. In the cellular/WLAN aggregation, it is assumed that, after the eNB 200 transmits a message about configuration of the WLAN communication to the UE 100 and the UE 100 performs a configuration based on the message received from the eNB 200, WLAN communication by the WLAN transceiver 112 may be started. In this case, if the UE 100 (terminal apparatus) is present in a country where transmission by the WLAN transceiver 112 is not authenticated, transmission of the UE 100 by the WLAN transceiver 112 is illegal.

Therefore, on the network side, the authentication related information is used to restrict the illegal usage of the UE 100 (terminal apparatus) not granted with the authentication (usage permission) by the laws or ordinances.

It is noted that, an example of an act in which the eNB 200 encourages the illegal usage by the UE 100 (terminal apparatus) includes a case in which the eNB 200 transmits, to the UE 100, a configuration message (instruction) having the content described below.

- instruction for transmission using a RAT (WLAN) for which the UE 100 is not authenticated
- instruction for switching from off to on of a communication unit (WLAN transceiver 112) configured to perform communication using a RAT for which the UE 100 is not authenticated As illustrated in FIG. 9, information on the model identifier is related not only with the use authentication information, but also with the authentication related information (Regulation). In FIG. 9, a terminal apparatus whose IMEI (TAC) is A, is authenticated for transmission by the WLAN transceiver 112 in Japan (JP), the United States of America/Canada (USA/Canada), and the European Union (EU). On the other hand, a terminal apparatus whose IMEI (TAC) is B, is authenticated for transmission by the WLAN transceiver 112 in Japan (JP), and the United States of America/Canada (USA/Canada). The terminal apparatus is not authenticated in the European Union (EU).

It is noted that, a basic operation of the cellular/WLAN aggregation will be described with reference to FIG. 10. FIG. 10 is a diagram illustrating a basic operation of the cellular/WLAN aggregation.

The cellular/WLAN aggregation is a communication scheme in which data (traffic) of the UE 100 is transmitted and received by using both the cellular communication and the WLAN communication. Specifically, in the cellular/WLAN aggregation, traffic (user data) belonging to an identical or different data bearer is transmitted and received by using both the cellular communication and the WLAN communication.

In FIG. 10, between the UE 100 and the S-GW 500 (EPC 20), a data bearer #1 (first data bearer) configured to not pass through the AP 300 but through the eNB 200, and a data bearer #2 (second data bearer) configured to pass through the AP 300 and the eNB 200, are established. It is noted that if the cellular/WLAN aggregation is executed, the data bearer #2 only may be established, and both the data bearer #1 and the data bearer #2 may be established.

The data bearer #1 is a data bearer for normal cellular communication. On the other hand, the data bearer #2 is a data bearer for the cellular/WLAN aggregation. The data bearer #2 is split in the eNB 200 (for example, the PDCP layer). One (data bearer #2-1) of the split bearers is terminated, without passing through the AP 300, at the UE 100, and the other (data bearer #2-2) of the split bearers is terminated at the UE 100 after passing through the AP 300. It is noted that the data bearer #2-2 may be terminated at the UE 100 after passing not only through the AP 300 but also through a WLAN GW (gateway apparatus) configured to accommodate the (plurality of) APs 300.

The UE 100 transmits and receives the data by using at least the data bearer #2 if the cellular/WLAN aggregation is executed.

Specifically, if the cellular/WLAN aggregation is executed, the eNB 200 divides, in the downlink, the data belonging to the data bearer #2, into data transmitted by the cellular communication (cellular-side data) and data transmitted by the WLAN communication (WLAN-side data). The eNB 200 transmits, by the cellular communication, the cellular-side data to the UE 100 by the data bearer #2-1. On the other hand, the eNB 200 transmits to the AP 300, by using a direct communication pathway, the WLAN-side data. The AP 300 transmits, by the WLAN communication, the WLAN-side data received from the eNB 200, to the UE 100, by the data bearer #2-2.

On the other hand, in the uplink, the UE 100 divides the data belonging to the data bearer #2, into data transmitted by the cellular communication (cellular-side data) and data transmitted by the WLAN communication (WLAN-side data). The UE 100 transmits, by the cellular communication, the cellular-side data to the eNB 200 by the data bearer #2-1. On the other hand, the UE 100 transmits, by the WLAN communication, the WLAN-side data, to the AP 300, by the data bearer #2-2. The AP 300 transmits, by using a direct communication pathway, the WLAN-side data received from the UE 100, to the eNB 200. The eNB 200 combines (reconstructs) the cellular-side data received from the UE 100 and the WLAN-side data received from the AP 300, and transmits the resultant data to the S-GW 500.

It is noted that in the cellular/WLAN aggregation, all the data belonging to the data bearer #2 may be transmitted and received by the cellular communication and all the data belonging to the data bearer #2 may be transmitted and received by the WLAN communication.

Further, description proceeds with a case where the eNB 200 and the AP 300 are separated; however, the eNB 200 may be an eNB 200 configured to be compatible with the cellular/WLAN.

Next, an operation according to the modification will be described.

In FIG. 11, steps 5110 to 5130 correspond to steps S10 to S30.

Here, in step S130, the EIR 500 that received the checking information from the MME 400 checks, based on the apparatus information stored in the memory 530, the (status of) apparatus identifier included in the checking information.

In the present modification, as illustrated in FIG. 10, information on the model identifier is related not only with the use authentication information, but also with the authentication related information. Therefore, the EIR 500 may include the authentication related information, into the response notified to the MME 400 in step 140. Alternatively, if the EIR 500 knows a country where the UE 100 (terminal apparatus) is located, the EIR 500 may include only the authentication related information of the country into the response. It is noted that, by receiving information on the country where the UE 100 (terminal apparatus) is located together with the checking information, the EIR 500 can know the country where the UE 100 (terminal apparatus) is located. Alternatively, if a country where the UE 100 accessible to the MME 400 is located is fixed, the EIR 500 may determine that the UE 100 indicated by the apparatus identifier included in the checking information from the MME 400 is located in a predetermined country.

Step S140 corresponds to step S60. Further, in step S140, the MME 400 may determine, if the authentication related information is included in the acknowledgment, whether or not a message about the WLAN communication configuration (WLAN aggregation configuration, for example) can be notified to the UE 100. In the country where the UE 100 is located, if the UE 100 is authenticated for the WLAN communication, the MME 400 determines that the message can be notified. The MME 400 notifies the eNB 200 configured to manage a cell in which the UE 100 exists of the above indication. On the other hand, in the country where the UE 100 is located, if the UE 100 is not authenticated for the WLAN communication, the MME 400 determines that the message cannot be notified. The MME 400 notifies the eNB 200 configured to manage a cell in which the UE 100 exists of the above indication. The eNB 200 determines, in response to the notification from the MME 400, whether or not to transmit a message about the configuration of the WLAN communication to the UE 100. It is noted that if a notification that the message cannot be notified is received from the MME 400, the eNB 200 may transmit, to the UE 100, a message about a configuration of reception only rather than transmission by the WLAN transceiver 112.

As described above, the EIR 500 may store the apparatus information. Further, the EIR 500 may include the authentication related information, into the acknowledgment. Thereby, the MME 400 can determine whether or not the UE 100 is authenticated for the WLAN communication. As a result, it is possible to suppress, on the network side, the illegal usage of the UE 100 (terminal apparatus) not granted with authentication (usage permission) by the laws or ordinances.

Other Embodiments

In the above-described embodiment, the MME 400 notifies the UE 100 of the identity request, however, the present application is not limited thereto. The MME 400 may request the UE 100 to provide information on the model identifier. Therefore, the UE 100 may notify the MME 400 of the model identifier (TAC). Further, the UE 100 may notify, even if there is no request from the MME 400, the MME 400 of information on the model identifier. For example, the UE 100 may notify the MME 400, if the attach procedure is started.

Further, in the above-described embodiment, the EIR 500 accesses the DB 600, however, the present application is not limited thereto. For example, an HLR (Home Location Register) having a management function to manage subscriber information, and a call processing function may access the DB 600. Alternatively, the HLR may store the apparatus information. Further, not only the HLR, but also other network apparatus (such as an ANDSF server, and a server managed by a vendor) may access the DB, or store the apparatus information.

Further, in the above-described embodiment, the DB 600 may store, as in the modification, the authentication related information. It is noted that, the EIR 500 may store the apparatus information, or may not store the authentication related information.

Further, in the above-described embodiment, the apparatus information may be information obtained by associating information on the model identifier with information whether or not the use authentication by one NW operator has been received, or may be information obtained by associating information on the model identifier with information whether or not the use authentication by a plurality of NW operators has been received. For example, if the terminal apparatus is granted the use authentication by a first NW operator, but if not being granted the use authentication by a second NW operator, the apparatus information may be information obtained by associating information on the model identifier with the information.

Further, in the modification of the above-described embodiment, the cellular/WLAN aggregation has been described as an example, however, the present application is not limited thereto. In 3GPP Release 12 and later, when configuration about the supported cellular/WLAN wireless interworking technology is applied to the UE 100, the authentication related information may be used.

According to the cellular/WLAN wireless interworking technology, the UE 100 in an RRC connected state or in an RRC idle state performs a bidirectional traffic switching (network selection and traffic steering) between the E-UTRAN 10 and the WLAN 30. The traffic switching is performed at the initiative of the UE 100 (UE based) with an aid of the E-UTRAN 10. The traffic switching is performed in an APN (Access Point Name) unit.

The eNB 200 (or the MME 400) may decide, based on the determination result, whether or not to notify the UE 100 of assistance information used for a switching control. Alternatively, the eNB 200 may update the assistance information. For example, the eNB 200 may notify, if communication configuration by the WLAN transceiver 112 is impossible, the UE 100 of the assistance information that the traffic switching to the WLAN 30 is impossible, as configuration information.

It is noted that the assistance information includes: a strength (received power) threshold value and a quality threshold value of an E-UTRAN signal; a threshold value of a WLAN channel usage rate; a threshold value of a WLAN backhaul data rate; a strength (received power) threshold value and a quality threshold value of a WLAN signal; and the like. The assistance information may include a WLAN identifier on which the UE-based switching control is performed. The WLAN identifier includes an SSID, BSSID, HESSID, and the like. The assistance information may include a parameter that designates a period during which a threshold value (determination condition) should be satisfied.

It is noted that, in cellular/WLAN wireless interworking technology, traffic switching to the WLAN 30 is performed at the initiative of the UE. Therefore, upon determining that illegal usage by the terminal apparatus does not occur, the NW 700 may notify the UE 100 of the configuration information about the cellular/WLAN radio interworking, without performing the determination described above.

Furthermore, the configuration for communication by the WLAN transceiver 112 may be a configuration for licensed-assisted access (LAA) technology proposed in 3GPP Release 12 and later.

In the LAA, the UE 100 communicates with a cell operated in a licensed band (hereinafter, a licensed cell) and a cell operated in an unlicensed band (hereinafter, an unlicensed cell). The licensed cell may be used as a PCell and the unlicensed cell may be used as an SCell (or PSCell). If the UE 100 communicates with the licensed cell and the unlicensed cell, the licensed cell and the unlicensed cell may be managed by one node (for example, the eNB 200). It is noted that, if the licensed cell and the unlicensed cell are managed (controlled) by one eNB 200, the unlicensed cell (and the licensed cell) may be formed by a remote radio head (RRH) including a radio transceiver. Alternatively, the licensed cell may be managed by the eNB 200 and the unlicensed cell may be managed by a radio communication apparatus different from the eNB 200. The eNB 200 and the radio communication apparatus may exchange, via a predetermined interface (an X2 interface or an S1 interface), various types of information described later. The eNB 200 configured to manage the licensed cell may notify the radio communication apparatus of information obtained from the UE 100, and may notify the UE 100 of information obtained from the radio communication apparatus.

In the unlicensed band, in order to avoid interference with a system different from an LTE system (such as wireless LAN) or an LTE system of another operator, it is required to execute a CCA (Clear Channel Assessment) (so called Listen Before Talk (LBT)) before transmitting a radio signal. Specifically, in the CCA, in order to confirm whether or not frequency (carrier) in the unlicensed band is available, the eNB 200 measures interference power. The eNB 200 allocates, based on a measurement result of the interference power, a radio resource included in a frequency (carrier) confirmed to have an available channel, to the UE 100 (scheduling). The eNB 200 performs scheduling in the unlicensed cell via the unlicensed cell. Alternatively, the eNB 200 may perform scheduling in the unlicensed cell via the licensed cell (that is, cross-carrier scheduling).

Based on a determination result, the eNB 200 (or the MME 400) may decide whether or not to notify the UE 100 of the configuration information for executing the LAA.

Further, in the above-described embodiments, a case has been described where the UE 100 is authenticated based on laws or ordinances in each country; however, this is not limiting. For example, if the UE 100 is authenticated based on laws or ordinances in a region (a plurality of countries (such as the European Union), provinces and the like), it is evident that an operation similar to the operation described above may be executed. Therefore, in the above-described description, it is possible to replace "country" with "region".

In each of the above-described embodiments, as one example of a cellular communication system, the LTE system is described; however, the present application is not limited to the LTE system, and the present application may be applied to systems other than the LTE system. Specifically, in the above-described embodiment, a case is described where authentication of the UE 100 (terminal apparatus) is required for transmission using WLAN; however, the present application is not limited thereto. If authentication of the UE 100 is required for transmission using another RAT, an operation similar to the operation described above may be executed.

CROSS REFERENCE TO RELATED APPLICATIONS

The entire content of Japanese Patent Application No. 2015-035691 (filed on Feb. 25, 2015) is incorporated in the present specification by reference.

INDUSTRIAL APPLICABILITY

The present application is useful in the field of communication.

The invention claimed is:

1. A network apparatus in a mobile communication system, comprising:
   a storage unit configured to store apparatus information in which information on a model identifier of a terminal apparatus and use authentication information indicating that the terminal apparatus is granted a use authentication by a predetermined network operator are associated, the use authentication information indicating that the terminal apparatus conforms to a frequency provided by the predetermined network operator;
   a receiver configured to receive, from another network apparatus, information on a model identifier of a user terminal accessing a network managed by the predetermined network operator; and
   a controller configured to notify, based on the information on the model identifier of the user terminal and the apparatus information, the other network apparatus of information for determining whether or not to provide a communication service to the user terminal, wherein
   the information on the model identifier is an apparatus identifier for identifying the terminal apparatus,
   the apparatus identifier is an identifier partly configured by the model identifier,
   the storage unit stores the apparatus identifier and authentication related information on a country where a terminal apparatus is legally authenticated for transmission using a predetermined access technology, in an associated manner, and
   the controller includes the authentication related information corresponding to the apparatus identifier received from the other network apparatus, into the information for determining whether or not to provide the communication service to the user terminal.

2. The network apparatus according to claim 1, wherein the controller notifies the other network apparatus of the use authentication information corresponding to information on the model identifier received from the other network apparatus, as the information for determining.

3. The network apparatus according to claim 1, wherein the receiver receives the apparatus identifier by receiving a check request for checking a status of the apparatus identifier, and
the controller checks the apparatus identifier, based on the apparatus information, and notifies the other network apparatus of a check result as the information for determining.

4. The network apparatus according to claim 3, wherein the storage unit further stores the apparatus identifier and illegitimate information indicating that the terminal apparatus is an illegitimate terminal apparatus, in an associated manner, and
the controller notifies the other network apparatus of the check result for not providing the communication service to the user terminal, if the terminal apparatus is the illegitimate terminal apparatus, even when the terminal apparatus corresponding to the apparatus identifier is a terminal apparatus with a use authentication by the predetermined network operator.

5. A network apparatus in a mobile communication system, comprising:
a receiver configured to receive, from another network apparatus, information on a model identifier of a user terminal accessing a network managed by a predetermined network operator; and
a controller configured to obtain, from a storage device configured to store apparatus information in which information on a model identifier of a terminal apparatus and use authentication information indicating that the terminal apparatus is granted a use authentication by the predetermined network operator are associated, the use authentication information corresponding to the model identifier of the user terminal, wherein
the use authentication information indicates that the terminal apparatus conforms to a frequency provided by the predetermined network operator,
the controller notifies, based on the use authentication information obtained from the storage device and the model identifier of the user terminal, the other network apparatus of information for determining whether or not to provide a communication service to the user terminal,
the information on the model identifier is an apparatus identifier for identifying the terminal apparatus,
the apparatus identifier is an identifier partly configured by the model identifier,
the storage device stores the apparatus identifier and authentication related information on a country where a terminal apparatus is legally authenticated for transmission using a predetermined access technology, in an associated manner,
the controller obtains, together with the use authentication information, the authentication related information corresponding to the apparatus identifier received from the other network apparatus, and
the controller includes the authentication related information, into the information for determining whether or not to provide the communication service to the user terminal.

6. The network apparatus according to claim 5, wherein the controller notifies the other network apparatus of the use authentication information received from the storage device, as the information for determining.

7. The network apparatus according to claim 5, wherein the receiver receives the apparatus identifier by receiving a check request for checking a status of the apparatus identifier, and
the controller checks the apparatus identifier, based on the use authentication information received from the storage device, and notifies the other network apparatus of a check result as the information for determining.

8. The network apparatus according to claim 7, wherein the storage device further stores the apparatus identifier and illegitimate information indicating that the terminal apparatus is an illegitimate terminal apparatus, in an associated manner, and
the controller notifies the other network apparatus of the check result for not providing the communication service to the user terminal, if the terminal apparatus is the illegitimate terminal apparatus, even when the terminal apparatus corresponding to the apparatus identifier is a terminal apparatus with a use authentication by the predetermined network operator.

\* \* \* \* \*